United States Patent [19]

West et al.

[11] Patent Number: 4,489,915

[45] Date of Patent: Dec. 25, 1984

[54] VALVE

[75] Inventors: Michael D. West, Arlington Heights; Robert H. Dean, Evanston, both of Ill.

[73] Assignee: International Telephone and Telegraph Corporation, New York, N.Y.

[21] Appl. No.: 417,527

[22] Filed: Sep. 13, 1982

[51] Int. Cl.³ .............................................. F16K 25/00
[52] U.S. Cl. .................................. 251/161; 251/164; 251/188; 251/192
[58] Field of Search ............... 251/161, 164, 188, 189, 251/191, 175, 192

[56] References Cited

U.S. PATENT DOCUMENTS

| 343,283 | 6/1886 | Swabel | 251/188 |
|---|---|---|---|
| 3,193,244 | 7/1965 | Smith | 251/188 X |
| 3,260,498 | 7/1966 | Johnson | 251/188 X |
| 3,386,700 | 6/1968 | Greene | 251/175 |
| 3,446,234 | 5/1969 | Hungate | 251/191 X |
| 3,485,265 | 12/1969 | Buono | 251/188 X |
| 3,529,621 | 9/1970 | Christiansen | 251/175 X |

Primary Examiner—Harold W. Weakley
Attorney, Agent, or Firm—Donald J. Lenkszus

[57] ABSTRACT

A rotary plug valve includes a rotary plug which has a relatively thin-walled valving portion. To lock the valve in position or to achieve leak tight closure of the valve, the rotary plug is subjected to pressure such that the wall of the thin-walled valving portion deflects outward to tightly contact the surrounding wall of the plug receiving cavity in the valve housing.

11 Claims, 11 Drawing Figures

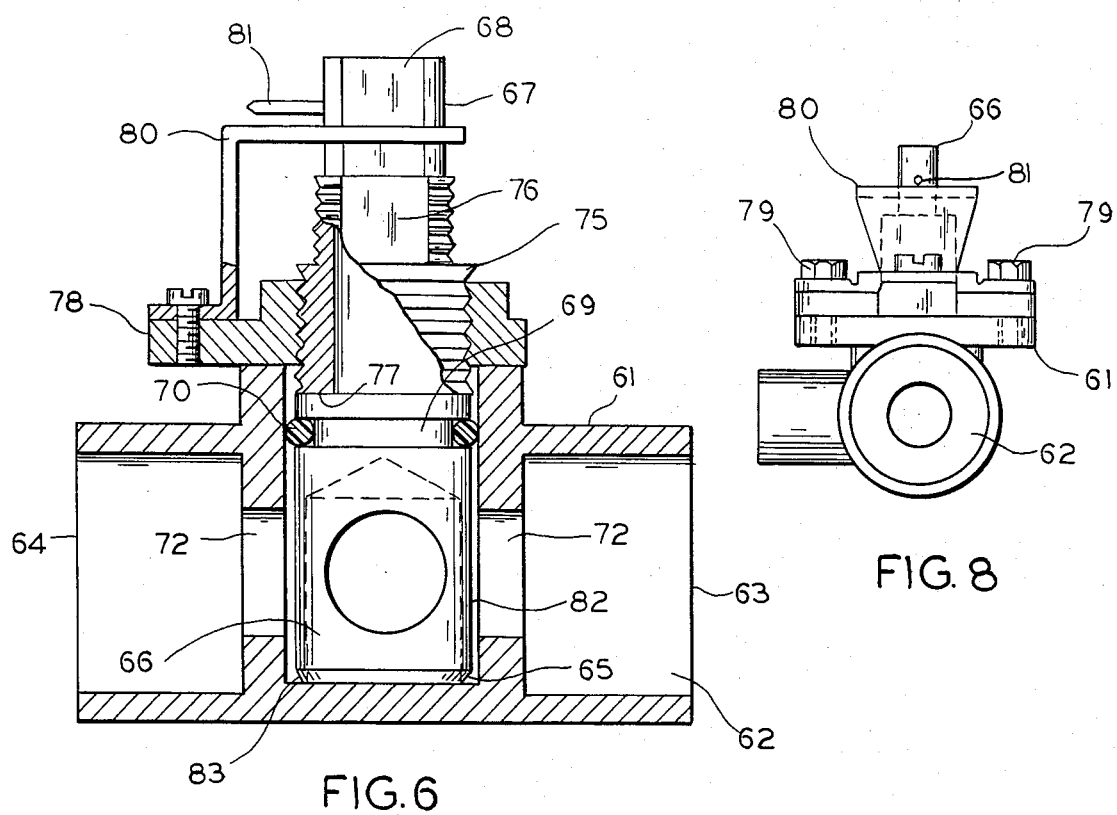
FIG. 6
FIG. 8
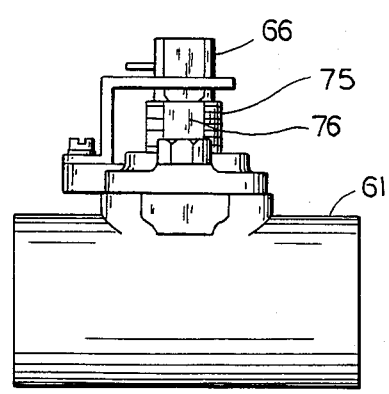
FIG. 7
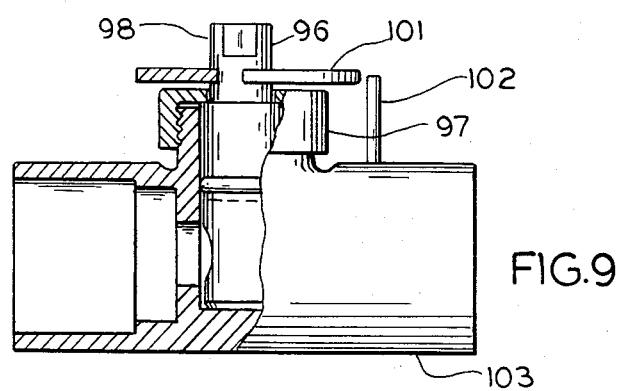
FIG. 9
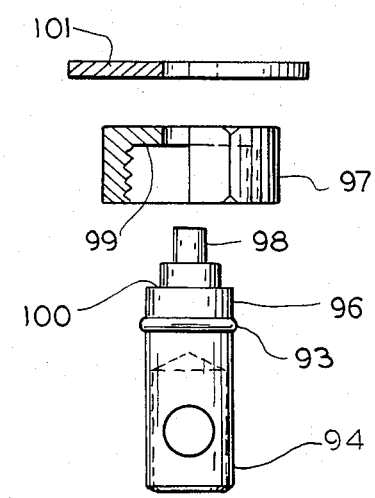
FIG. 10

VALVE

BACKGROUND OF THE INVENTION

This invention relates in general to a valve and more particularly to a control valve of the type known as a rotary plug valve used as a balance valve or a shut-off valve.

Valves of the general type to which the invention pertains are taught by U.S. Pat. Nos. 3,380,704; 3,314,643; 4,113,228; 3,590,473; and 4,113,228. In general valves of this type comprise a valve housing having a longitudinal bore which is connected in series in a pipe. The valve housing has a cylindrical plug or rotor member mounted therein for rotation about an axis perpendicular to the longitudinal bore. The rotor is typically of solid metal and is pierced by a passage so that fluid may flow through the pipe when the rotor is turned to a position wherein the passage is coincident with the longitudinal bore. If the rotor is turned by 90 degrees, the passage is perpendicular to the bore and fluid cannot flow.

One problem in the manufacture of such valves is that of meeting current leakage specifications.

SUMMARY OF THE INVENTION

It is an object of the invention to provide a leak tight rotary plug valve which does not require extremely precise machining.

In accordance with the principles of the invention, the rotor of a rotary plug valve is a hollow thin-walled plug. To obtain a leak tight closure of the valve, the thin-walled plug is loaded, i.e., subjected to pressure, such that the walls of the plug deflect outward to seal the flow ports of the longitudinal bore.

In an embodiment of the invention, the rotary plug comprises a thin-walled hollow cylindrical portion and in accordance with the principles of the invention the open end of the cylindrical portion has a chamfered edge to assure outward deflection of the wall when loaded.

BRIEF DESCRIPTION OF THE DRAWINGS

FIG. 6 is a side elevational view of a second embodiment of the invention taken in cross-section.

FIG. 7 is a side view of the embodiment shown in FIG. 6.

FIG. 8 is an end view of the embodiment shown in FIG. 6.

FIG. 9 is a side view of a third embodiment of the invention taken in partial cross-section;

FIG. 10 is an exploded end view of the embodiment of FIG. 9 taken in partial cross-section.

DETAILED DESCRIPTION

Figure 1:
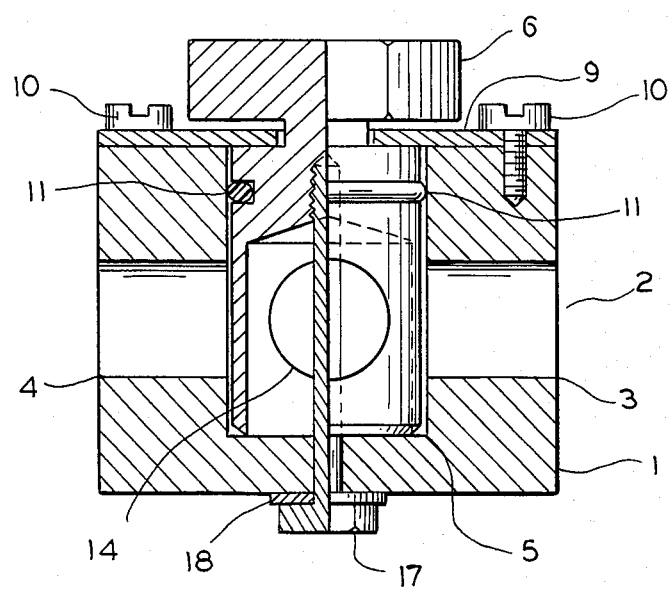
FIG. 1 is a side elevational view of one embodiment of the invention taken in cross-section.
Figure 2:
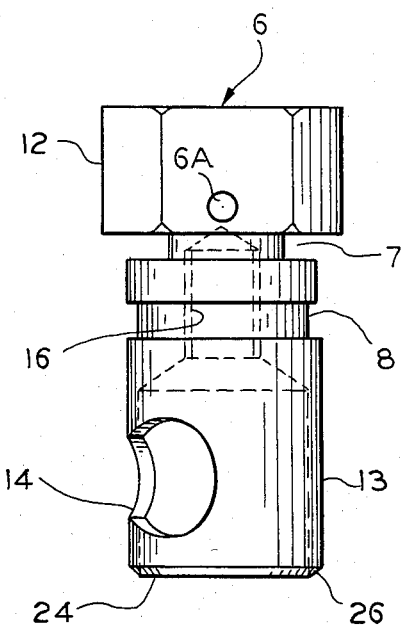
FIG. 2 illustrates the rotary plug of FIG. 1.

The valve of FIG. 1 includes a valve body 1 having a longitudinal bore 2 which at its ends 3, 4 may be adapted to connect serially with a pipe (not shown). The connections may be sweat soldered or the ends may be appropriately threaded. A vertical bore 5 is provided into which rotary plug 6 is inserted. As is more clearly shown in FIG. 2, the plug 6 at its upper end includes a first groove 7 and a second groove 8. The first groove 7 is engaged by a top plate 9 which retains the plug 6 in the valve body 1. Top plate 9 is secured to the valve body 1 by screws 10. An elastomeric seal 11 is placed in groove 8 and serves to prevent leakage from the top of the valve. The head 12 of plug 6 is in the form of a hex head bolt which may be turned by a wrench. The lower portion of plug 6 is in the form of a hollow cylinder with relatively thin wall 13. Two holes 14, 15 are provided opposite each other. The plug 6 includes a threaded bore 16 adapted to receive a screw 17. Seal 18 is provided around screw 17.

In operation, the valve may be opened or closed or positioned to an intermediate position by rotating the valve 6 by means of a wrench applied to the head 12. In the closed position the apertures 14, 15 are positioned as shown in FIG. 1. By rotating the plug, the apertures 14 and 15 may be placed in fluid communication with the longitudinal bore 2.

Figure 4:
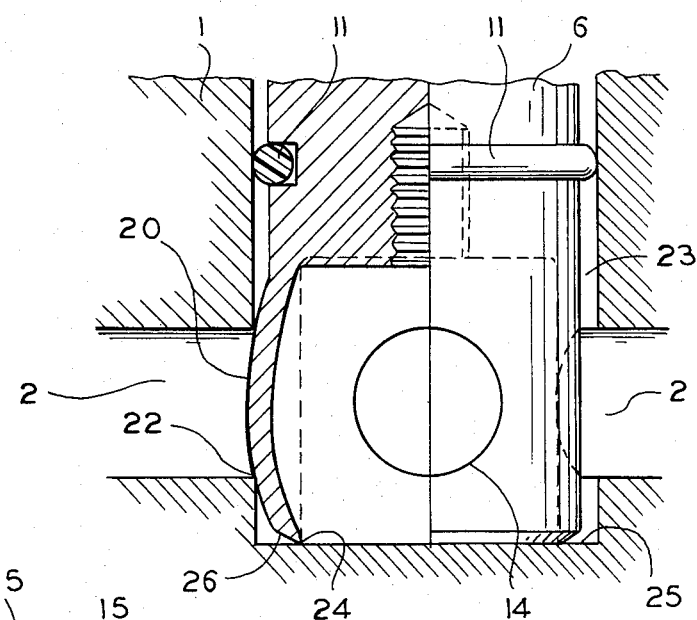
FIG. 4 is a side elevational view of a portion of the rotary plug taken in partial cross-section and illustrating in the left half thereof the effect of loading the plug.
Figure 5:
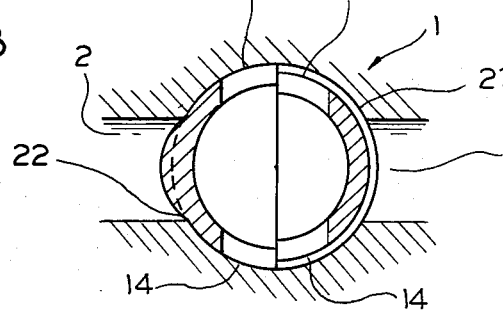
FIG. 5 is a top cross-sectional view of the rotary plug of FIG. 4.

To achieve a leak tight closure of the valve, the plug is rotated again to the position shown in FIG. 1. Tightening the pull down screw 17 exerts downward pressure on the plug 17 and the wall 20 of the cylindrical portion is deflected outwardly such that the portions of wall 20 adjacent the bore 2 are deflected into the bore 2. The left side of FIGS. 4 and 5 illustrate the effect of a downward force which loads the wall of plug 6. The right side of FIGS. 4 and 5 illustrates the plug 6 with the walls unloaded. It is to be noted that the screw 17 is not shown in FIGS. 4 and 5. As screw 17 is tightened a downward pressure is exerted on the plug 6 pulling the plug against the bottom surface 21 of bore 5. A downward load is thus applied to the thin wall 20 of the hollow cylindrical portion of plug 6.

As loading on the wall 20 increases, the wall 20 deflects outward. The deflecting wall 20 seals the body port 22 formed at the junction of longitudinal bore 2 and vertical bore 5. More specifically, the deflecting wall 20 will decrease the clearance 23 between the valve body 1 and the plug 6 such that deflecting wall 20 will contact the total perimeter of the port 22 sealing the port 22 from passing fluid.

The portions of wall 20 not in alignment with the port 22 are constrained by the valve body 1 after the clearance 23 is reduced and further loading of the wall 20 concentrates deflections at the portion of wall 20 in alignment with the port 22. Further loading on the wall 20 tends to bow the wall 20 into the body port 22 assuring complete and uniform contact along the perimeter of port 22 and mechanically retaining the wall 20 in the deflected position shown.

Removing the loading on the wall 20 allows the wall 20 to spring back to its original position shown in the right side of FIGS. 4 and 5 and the original clearance 23 reoccurs allowing unconstrained rotation of plug 6.

The screw 17 is positioned at the center of plug 6 so that loading is centered to produce symetrical deflection of the wall 20. The bottom 24 of the plug and the bottom 25 of the bore 5 should be flat to avoid nonsymetrical bending of the wall 20. A chamfer 26 is provided on the bottom of wall 20 to offset loading on the wall 20 to force outward bending. The height of plug 6 will decrease when screw 17 is tightened and the O-ring seal 11 will slide along the wall of bore 5.

A further feature of the above described structure is that the plug 6 tends to be self-aligned in the bore 5 due to side constraints during deflection and since all clearances between the plug 6 and the wall of bore 5 are reduced before the wall 20 deflects into the ports. With this arrangement diametrical clearances between the plug 6 and the wall of bore 5 are in the range of 0.0005 inch to 0.004 inch and are easily within the range of common machining tolerances.

Figure 3:
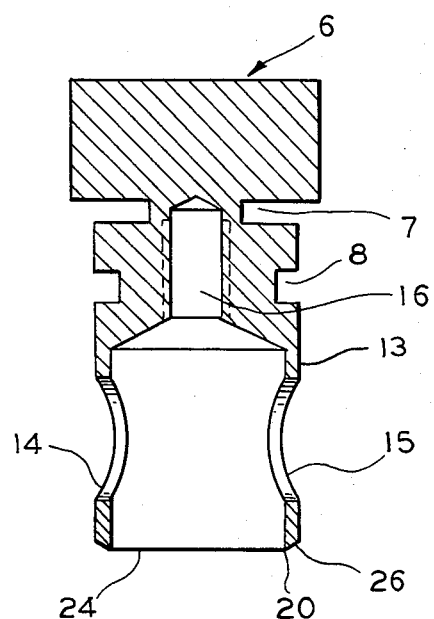
FIG. 3 is a side elevational view of the rotary plug of FIG. 1 taken in cross-section.

In the embodiment of FIGS. 6, 7 and 8 the pull down screw of FIG. 1 is replaced with a threaded collar and tapped top plate arrangement to load the walls of the plug. Valve body 61 has a longitudinal bore 62 and is connected serially in a fluid system at ends 63, 64. The bore 2 includes two ports 72. A plug 66 is in verticle bore 65. The plug 66 includes an elongated cylindrical head 67 having wrench flats 68 thereon. The plug includes a groove 69 for carrying an O-ring 70. The lower portion of plug 60 is substantially identical to that shown in FIG. 3 with the exception that the threaded bore 16 of FIG. 3 is not provided.

An externally threaded sleeve or collar 75 having wrench flats 76 is positioned on the head 67 with its lower end resting on a surface 77 of plug 66. A tapped top plate 78 is fastened to the valve body 61 by means of screws or bolts 79. The top plate 78 retains the collar 75 in position. A scale 80 is affixed to the top plate and a pointer 81 is provided. A teflon ring may be provided on surface 77 to reduce tightening torque.

In operation, the valve of FIG. 6 operates identical to that of FIG. 1 with the exception that downward pressure on the lower portion of the plug is provided by tightening the collar 76. As collar 76 is tightened, the wall 82 of the lower portion of plug 66 is loaded with the result that wall 82 is deflected in the same manner as shown and described above in FIGS. 4 and 5. A chamfered surface 83 is also provided in the plug 66 to assure that the wall 82 deflects outward.

With the arrangement of FIGS. 6, 7, and 8 the maximum loading which may be applied is greater than when a pull down screw is used. This arrangement also has the advantages that there is no lowering of the flow coefficient of the valve which would occur when a pull down screw is in the flow path. The bottom hole in the valve body is eliminated as well as the added sealing area.

In the valve of FIGS. 9 and 10 loading of the wall 91 of the plug 96 is also provided by a collar 97. The collar engages a top surface or shoulder 92 of the plug 96. As in the two previously described embodiments, an O-ring seal 93 is carried in a groove on the plug 96 a head portion 98 extends through collar 97. A lip portion 99 of collar 97 engages a surface 100 of plug 96. A scale 101 is press fit onto head portion 98 and a pointer 102 is pressed into housing 103.

The operation of the valve of FIGS. 9 and 10 is similar to that of FIG. 6 in that tightening of collar 97 loads the wall 91 of plug 96 causing wall 91 to deflect outward.

Figure 11:
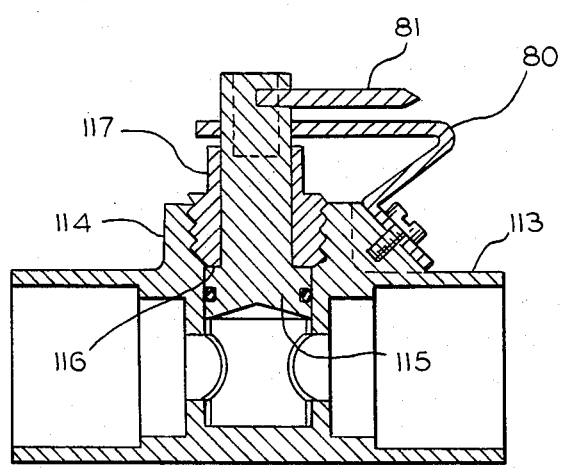
FIG. 11 is a side cross-sectional view of a fourth embodiment.

The valve of FIG. 11 is similar to that of FIG. 6. The valve body 113 includes an internally threaded raised shoulder portion 114. Valve plug 115 includes a shoulder 116. The collar 117 is externally threaded and engages shoulder 116 of the valve plug.

Each of the four embodiments provides a leak tight closure of the valve. Leak tight closure may be defined as no drops of system fluid forming and passing from the exit of the valve. Wetting may occur on the plug at the exit port but does not form a drop and move down stream from the exit port.

In addition to the advantages set forth hereinabove, the novel valves described herein may advantageously be used as throttling valves since the provision of loading the plug may be used to lock the plug at a position other than the closed position. Once the pull down screw or collar is tightened the plug is retained and held mechanically in position until manually readjusted.

For the embodiments described above, the maximum operating temperature limit of the valve is restricted by the temperature limit of the valve body to O-ring seal. Since the plug to valve body port seal is metal to metal, this seal does not reduce the temperature limit. As will be obvious to one skilled in the art, the elastomeric O-ring may be replaced by other seal types to further increase the temperature limit of the valve.

Also, high pressure limits may be obtained with valves in accordance with the invention. The maximum pressure limit for closure of the plug is dependent on the wall section of the plug. A ¾ inch size valve in accordance with the invention has a maximum shut off pressure well above 1000 p.s.i.

A further advantage of the invention is that the plug is self centering in the valve body core.

Additionally, the accumulation of dirt, debris and deposits is not as detrimental to valves in accordance with the invention as it is in other valves since the metal-to-metal seal is more impervious to foreign matter than an elastomeric seal and the flexing of the plug wall inward when unloaded creates a clearance between the plug and the valve body so that any accumulated dirt, debris, or deposits do not rub against either the valve body or plug when the plug is turned for repositioning.

It will be understood by those skilled in the art that the rotary plug does not necessarily have to be a cylinder as shown in the illustrative embodiments. A thin-walled sphere could also be used as the lower portion of the plug. The wall of the sphere could be deflected by loading in the same manners as the walls of the cylindrical plugs are deflected as described herein.

The valves described herein may find application use in various hydronic heating systems or industrial applications. The handling of chemicals, caustic substances, or abrasive fluids that are harmful to elastomeric-to-metal seals at the flow ports may be accomplished with valves in accordance with the invention without harm or reduction in shut off ability.

What is claimed is:

1. A valve comprising:
    a valve housing having a flow passage therein, and a cavity adapted to receive a valve plug;
    a metallic valve plug disposed within said cavity, said valve plug having a thin-walled hollow cylindrical portion in alignment with said flow passage and having flow apertures therethrough, said cylindrical portion having a longitudinal axis,
    said valve plug being rotatable in said cavity to place said flow apertures in fluid communication with said flow passage and being rotatable to place said flow apertures out of fluid communication with said flow passage, said cavity having a surface adapted to engage the end of said cylindrical portion; and means for applying pressure to said valve plug in the direction of said longitudinal axis for urging said end against said surface and to subject said wall to loading forces, said end being chamfered such that when said cylinder is subjected to loading pressures the wall of said hollow cylindrical portion is deflected into contact with the adjacent wall of said cavity.

2. A valve in accordance with claim 1 wherein said means comprises a pull down screw.

3. A valve in accordance with claim 1 wherein said means comprises a threaded collar; said plug includes a surface adapted to engage said collar, said collar being retained on said housing and movable to subject said cylinder portion to loading pressure.

4. A valve in accordance with claim 3 comprising a plate mounted on said housing having a threaded portion adapted to engage said threaded collar.

5. A valve in accordance with claim 3, wherein said housing includes a threaded portion adapted to engage said threaded collar.

6. A valve comprising:
a valve housing having a flow passage extending therethrough, said valve housing having a rotor receiving bore terminating in a flat surface and intersecting said flow passage, the intersections of said bore and said passage forming an inlet port and an outlet port;
a metallic rotor member comprising:
a lower portion disposed in said bore and an upper portion extending from said valve housing, said lower portion being of hollow cylindrical shape and having relatively thin walls, said lower portion having a longitudinal axis, said lower portion resting on said flat surface; and the end of said lower portion resting on said flat surface includes a chamfer on its outside edge, said lower portion having first and second flow ports, said rotor member being rotatable to place said first and second flow ports into or out of communication with said inlet and said outlet ports;
said valve including a member mounted on said housing and engaging said rotor member, said member being operable to exert pressure along said longitudinal axis to provide loading on said relatively thin walls, said chamfer serving to direct said loading such that said thin walls deflect outwardly to contact the wall of said bore such that when said first and second flow ports are out of communication with said inlet and outlet ports said relatively thin walls seal said inlet and outlet ports.

7. A valve in accordance with claim 6, wherein said member comprises a pull down screw extending through said valve housing and engaging said rotor.

8. A valve in accordance with claim 6, wherein said member comprises a threaded collar coupled to said housing and including a surface contacting a corresponding surface on said rotor.

9. A valve in accordance with claim 8, wherein said rotor includes a shoulder forming said corresponding surface.

10. A valve in accordance with claim 9, wherein said collar internally threaded, and said valve housing includes an externally threaded portion adopted to engage said threaded collar.

11. A valve in accordance with claim 9, wherein said collar is externally threaded and said valve comprises a second member secured to said valve housing, said second member having an internally threaded aperture for engaging said threaded collar.

* * * * *